(12) United States Patent
Vasamsetti et al.

(10) Patent No.: US 12,386,719 B2
(45) Date of Patent: Aug. 12, 2025

(54) SYSTEMS AND METHODS FOR OPTIMIZING RESOURCES FOR APPLICATIONS DEPLOYED IN PRIMARY AND BACKUP GEOGRAPHICALLY DISPERSED CLOUD ENVIRONMENTS

(71) Applicant: Verizon Patent and Licensing Inc., Basking Ridge, NJ (US)

(72) Inventors: Satish S. Vasamsetti, San Francisco, CA (US); Jerry Steben, Fort Worth, TX (US); Raymond WaiMan So, San Ramon, CA (US); Peter B. Sensenbrenner, North Richland Hills, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 17/931,236

(22) Filed: Sep. 12, 2022

(65) Prior Publication Data

US 2024/0086297 A1    Mar. 14, 2024

(51) Int. Cl.
*G06F 9/44* (2018.01)
*G06F 9/50* (2006.01)
*G06F 11/14* (2006.01)
*G06F 11/34* (2006.01)

(52) U.S. Cl.
CPC .......... *G06F 11/3433* (2013.01); *G06F 9/505* (2013.01); *G06F 11/1451* (2013.01)

(58) Field of Classification Search
CPC .................................. G06F 11/3433
USPC ........................................ 718/105
See application file for complete search history.

(56) References Cited

U.S. PATENT DOCUMENTS

| | | | |
|---|---|---|---|
| 10,866,757 B2 * | 12/2020 | Bhanushali | G06F 11/1446 |
| 2012/0030670 A1 * | 2/2012 | Vijay | G06F 11/0757 718/1 |
| 2016/0179568 A1 * | 6/2016 | Bezbaruah | G06F 11/1446 718/1 |
| 2018/0077029 A1 * | 3/2018 | Mittal | H04L 41/5096 |
| 2022/0308925 A1 * | 9/2022 | Shilane | G06F 16/162 |

* cited by examiner

*Primary Examiner* — Timothy A Mudrick (57) ABSTRACT

A primary application cloud instance may receive historical usage of an application, may allocate, based on the historical usage, a quantity of cloud resources for enabling the application to be accessed, and may enable the application to be accessed. The primary application cloud instance may provide, to a backup application cloud instance that allocates a minimum quantity of cloud resources for providing a skeletal version of the application, heartbeat and session state information associated with the primary application cloud instance, and the quantity of cloud resources for enabling the application to be accessed. The primary application cloud instance may provide, to the backup application cloud instance, an indication of a failure of the primary application cloud instance, via the heartbeat and session state information, to cause the backup application cloud instance to allocate the quantity of cloud resources and to enable access to the application.

20 Claims, 8 Drawing Sheets

SYSTEMS AND METHODS FOR OPTIMIZING RESOURCES FOR APPLICATIONS DEPLOYED IN PRIMARY AND BACKUP GEOGRAPHICALLY DISPERSED CLOUD ENVIRONMENTS

BACKGROUND

Mission critical applications, such as voice applications, are deployed in fault tolerant cloud computing environments to ensure no service interruptions.

DETAILED DESCRIPTION OF EXAMPLE EMBODIMENTS

The following detailed description of example implementations refers to the accompanying drawings. The same reference numbers in different drawings may identify the same or similar elements.

Mission critical applications may be deployed in a primary (e.g., active) instance and a backup instance, such that both instances may be consuming resources but only the primary instance is being utilized. In telecommunications networks, a backup instance of an application (e.g., a backup application cloud instance) typically executes in a geographically dispersed location (e.g., a threshold distance from a location of a primary instance of the application) but does not transport active application traffic. Deploying a primary instance and a backup instance for an application results in doubling of computing resource usage and in idling half of the assigned computing resources. Idle computing resources increase costs of providing the application, unnecessarily consumes power, and increases cooling requirements for computing resources (e.g., which contributes to greenhouse gas emissions). Thus, current techniques for deploying primary and backup instances of an application consume computing resources (e.g., processing resources, memory resources, communication resources, and/or the like), networking resources, and/or other resources associated with requiring idle computing resources for the application, unnecessarily consuming power with the idle computing resources for the application, unnecessarily cooling the idle computing resources for the application, and/or the like.

Some implementations described herein provide a primary application cloud instance and a dormant backup application cloud instance (e.g., that may be turned into a primary application cloud instance with fast allocation), that optimizes resources for applications deployed in primary and backup geographically dispersed cloud environments. For example, the primary application cloud instance may receive historical usage of an application, and may allocate, based on the historical usage, a quantity of cloud resources for enabling the application to be accessed. The primary application cloud instance may enable the application to be accessed, and may provide, to a backup application cloud instance, heartbeat and session state information associated with the primary application cloud instance. The backup application cloud instance may allocate a minimum quantity of cloud resources for providing a skeletal version of the application. The primary application cloud instance may provide, to the backup application cloud instance, the quantity of cloud resources for enabling the application to be accessed, and may provide, to the backup application cloud instance, an indication of a failure of the primary application cloud instance, via the heartbeat and session state information. The backup application cloud instance may allocate the quantity of cloud resources and to enable the application to be accessed.

In this way, the primary application cloud instance (or the backup application cloud instance) optimizes resources for applications deployed in primary and backup geographically dispersed cloud environments. For example, the primary application cloud instance may be allocated a quantity of cloud resources necessary to execute an application, and the backup application cloud instance may be allocated a minimum quantity of cloud resources for providing a skeletal version of the application. The backup application cloud instance may also reserve the quantity of cloud resources utilized by the primary application cloud instance to execute the application. Thus, the primary application cloud instance and the backup application cloud instance may conserve computing resources, networking resources, and/or other resources that would have otherwise been consumed by requiring idle computing resources for the application, unnecessarily consuming power with the idle computing resources for the application, unnecessarily cooling the idle computing resources for the application, and/or the like.

FIGS. 1A-1E are diagrams of an example 100 associated with optimizing resources for applications deployed in primary and backup geographically dispersed cloud environments. As shown in FIGS. 1A-1E, example 100 includes user devices 105, a primary application cloud instance 110, and a backup application cloud instance 115. A location of the primary application cloud instance 110 may be geographically dispersed (e.g., by a threshold distance) from a location of the backup application cloud instance 115. Each of the primary application cloud instance 110 and the backup application cloud instance 115 may include a cloud computing environment that provides an application for utilization by the user devices 105. Further details of the user devices 105, the primary application cloud instance 110, and the backup application cloud instance 115 are provided elsewhere herein.

Figure 1A:
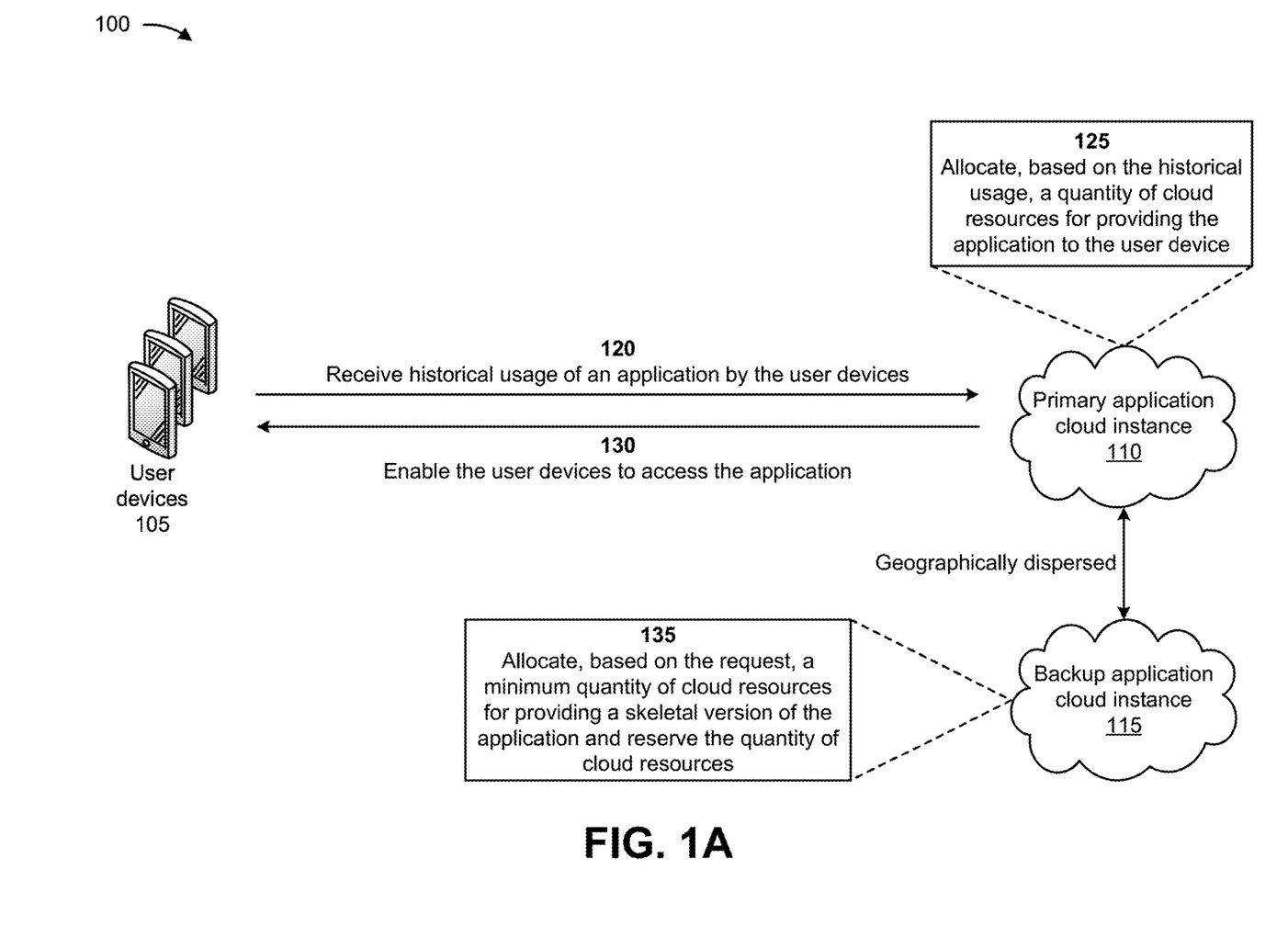
FIGS. 1A-1E are diagrams of an example associated with optimizing resources for applications deployed in primary and backup geographically dispersed cloud environments.

As shown in FIG. 1A, and by reference number 120, the primary application cloud instance 110 may receive historical usage of the application by the user devices 105 over time. For example, users of the user devices 105 may wish to access the application, and may cause the user devices 105 to generate requests for the application. The users of the user devices 105 may cause the user devices 105 to utilize the application over time. The historical usage of the application may correspond to the user devices 105 utilization of the application over time.

As further shown in FIG. 1A, and by reference number 125, the primary application cloud instance 110 may allocate, based on the historical usage, a quantity of cloud resources for enabling the application to be accessed by the user devices 105. For example, the primary application cloud instance 110 may review the historical usage, and may determine the quantity of cloud resources requested by the application (e.g., for enabling the user devices 105 to access the application) based on reviewing the historical usage. The primary application cloud instance 110 may allocate the quantity of cloud resources (e.g., processing resources, memory resources, communication resources, networking resources, and/or the like) from the primary application cloud instance 110. The quantity of cloud resources may enable the primary application cloud instance 110 to provide the application to the user devices 105.

As further shown in FIG. 1A, and by reference number 130, the primary application cloud instance 110 may enable the user devices 105 to access the application. For example, the primary application cloud instance 110 may utilize the quantity of cloud resources to enable the user devices 105 to access the application. The user devices 105 may utilize the application from the primary application cloud instance 110 and may interact with the application via the primary application cloud instance 110 (e.g., provide inputs to the application, receive information from the application, and/or the like).

As further shown in FIG. 1A, and by reference number 135, the backup application cloud instance 115 may allocate, based on the request, a minimum quantity of cloud resources for providing a skeletal version of the application and may reserve the quantity of cloud resources. For example, the backup application cloud instance 115 may review the historical usage, and may determine the minimum quantity of cloud resources for providing the skeletal version of application to the user devices 105 based on reviewing the historical usage. The backup application cloud instance 115 may also determine the quantity of cloud resources requested by the application (e.g., for enabling the user devices 105 to access the application) based on reviewing the historical usage. The backup application cloud instance 115 may allocate the minimum quantity of cloud resources (e.g., processing resources, memory resources, communication resources, networking resources, and/or the like) from the backup application cloud instance 115 (e.g., three out of ten resources, four out of twelve resources, and/or the like), and may reserve the quantity of cloud resources from the backup application cloud instance 115. The backup application cloud instance 115 may enable a threshold percentage (e.g., a configurable parameter) of the quantity of cloud resources to conserve cloud resources at the backup application cloud instance 115.

Figure 1B:
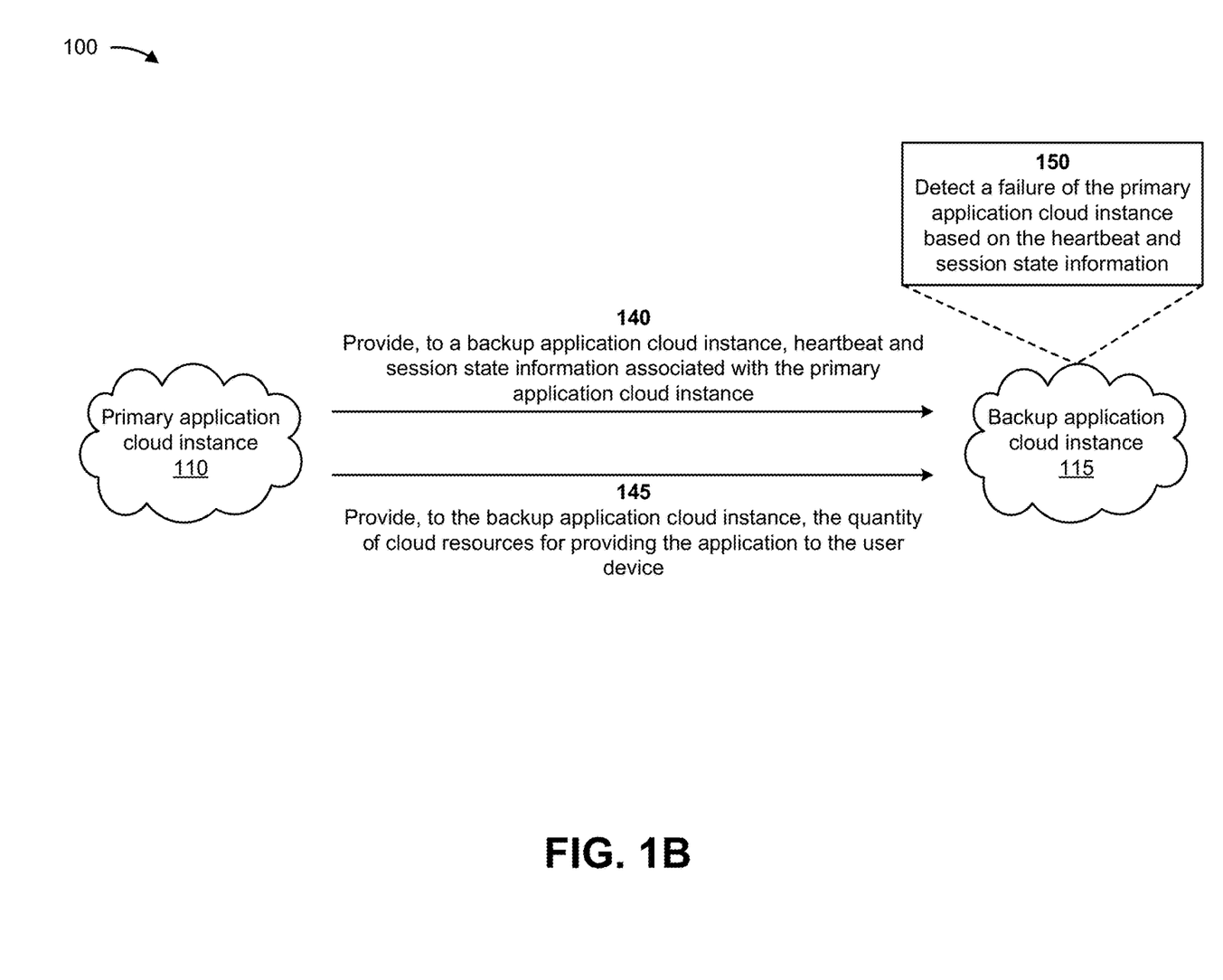

As shown in FIG. 1B, and by reference number 140, the primary application cloud instance 110 may provide, to the backup application cloud instance 115, heartbeat and session state information associated with the primary application cloud instance 110. For example, the primary application cloud instance 110 may generate the heartbeat and session state information while the primary application cloud instance 110 is enabling the application to be accessed by the user devices 105. The heartbeat state information may include information indicating whether the primary application cloud instance 110 is operational and/or functioning correctly. The session state information may include information indicating whether the primary application cloud instance 110 is enabling the user devices 105 to access the application. The primary application cloud instance 110 may continuously provide the heartbeat and session state information to the backup application cloud instance 115, may periodically provide the heartbeat and session state information to the backup application cloud instance 115, may provide the heartbeat and session state information to the backup application cloud instance 115 based on a request from the backup application cloud instance 115, and/or the like.

As further shown in FIG. 1B, and by reference number 145, the primary application cloud instance 110 may provide, to the backup application cloud instance 115, the quantity of cloud resources for enabling the user devices 105 to access the application. For example, the primary application cloud instance 110 may continuously provide, to the backup application cloud instance 115, a current cloud resource usage by the primary application cloud instance 110. The current cloud resource usage by the primary application cloud instance 110 may correspond to the quantity of cloud resources (e.g., of the primary application cloud instance 110) for enabling the user devices 105 to access the application. In some implementations, the primary application cloud instance 110 may periodically provide (e.g., at configurable periodic intervals), to the backup application cloud instance 115, the current cloud resource usage by the primary application cloud instance 110. In some implementations, the primary application cloud instance 110 may provide, to the backup application cloud instance 115, the current cloud resource usage by the primary application cloud instance 110 based on a request from the backup application cloud instance 115.

As further shown in FIG. 1B, and by reference number 150, the backup application cloud instance 115 may detect a failure of the primary application cloud instance 110 based on the heartbeat and session state information. For example, the backup application cloud instance 115 may fail to receive the heartbeat state information from the primary application cloud instance 110, and may detect the failure of the primary application cloud instance 110 based on failing to receive the heartbeat state information. Alternatively, or additionally, the backup application cloud instance 115 may fail to receive the session state information from the primary application cloud instance 110, and may detect the failure of the primary application cloud instance 110 based on failing to receive the session state information. Alternatively, or additionally, the backup application cloud instance 115 may identify an error in the session state information from the primary application cloud instance 110, and may detect the failure of the primary application cloud instance 110 based on identifying the error in the session state information. In some implementations, the failure of the primary application cloud instance 110 may indicate that the primary application cloud instance 110 is no longer capable of providing the user devices 105 with access to the application.

Figure 1C:
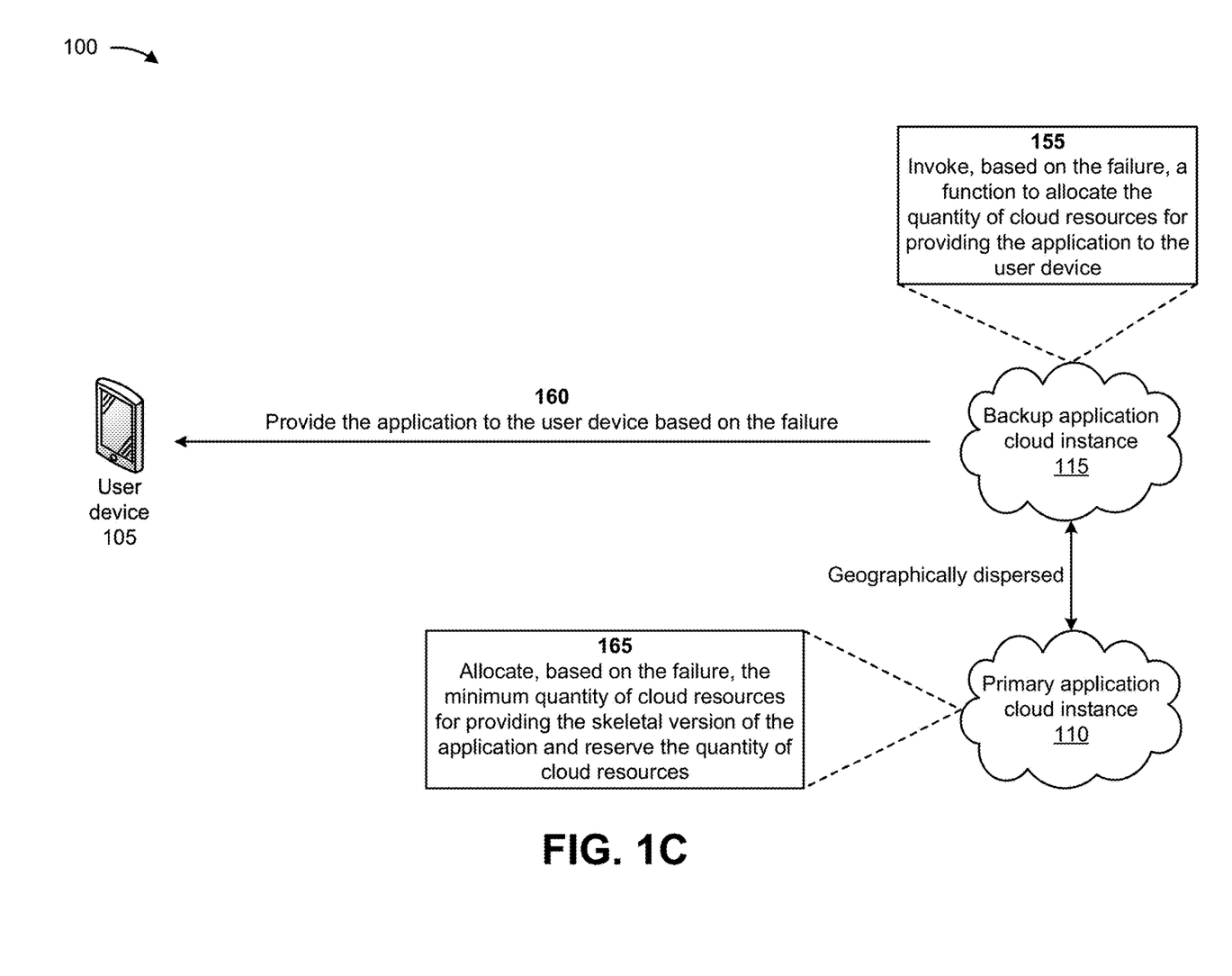

As shown in FIG. 1C, and by reference number 155, the backup application cloud instance 115 may invoke, based on the failure, a function to allocate the quantity of cloud resources for providing the user devices 105 access to the application. For example, when the backup application cloud instance 115 detects the failure of the primary application cloud instance 110, the backup application cloud instance 115 may become an active (e.g., primary) application cloud instance. In some implementations, the backup application cloud instance 115 may invoke, based on the failure, a fast resource addition function to allocate the quantity of cloud resources for providing the user devices 105 access to the application. Alternatively, or additionally, the backup application cloud instance 115 may invoke, based on the failure, a cloud autoscaling function to allocate the quantity of cloud resources for providing the user devices 105 access to the application. The fast resource addition function and/or the cloud autoscaling function may enable the backup application cloud instance 115 to quickly scale up cloud resources to the same quantity of cloud resources used by the primary application cloud instance 110 or to provide enough cloud resources to meet an existing traffic load of the application.

The fast resource addition function may include a function (e.g., an application programming interface (API)) that can be invoked by applications needing additional resources to handle planned or unplanned traffic hikes. Such an API may be invoked by applications during planned traffic spike events (e.g., a sporting event) or unplanned traffic spike events (e.g., a fiber cut, a failure of an active site, traffic rollovers to a backup site, and/or the like). The API may be invoked by applications, by a machine learning model, manually using a graphic user interface (GUI), and/or the like. Manual methods may be utilized for planned traffic spike events or a forced rollover to backup sites. A machine learning model may invoke the API based on learning historical traffic hikes and resource demand. The API may connect to a Kubernetes Horizontal Pod Scaler (HPA) as an external metrics API and to a Cluster Auto Scaler to add additional worker nodes as needed.

As further shown in FIG. 1C, and by reference number 160, the backup application cloud instance 115 may provide the user devices 105 access to the application based on the failure. For example, the backup application cloud instance 115 may utilize the quantity of cloud resources (e.g., or the allocated cloud resources for the existing traffic load) to provide the user devices 105 access to the application based on the failure of the primary application cloud instance 110. The user devices 105 may access the application from the backup application cloud instance 115 and may interact with the application via the backup application cloud instance 115 (e.g., provide inputs to the application, receive information from the application, and/or the like).

As further shown in FIG. 1C, and by reference number 165, the primary application cloud instance 110 may allocate (e.g., based on the failure) the minimum quantity of cloud resources for providing the skeletal version of the application and may reserve the quantity of cloud resources. For example, the primary application cloud instance 110 may become a backup dormant application cloud instance for the application based on the failure of the primary application cloud instance 110. The primary application cloud instance 110 may review the request for the application, and may determine the minimum quantity of cloud resources for providing the skeletal version of application to the user devices 105 based on reviewing the request for the application. The primary application cloud instance 110 may also determine the quantity of cloud resources requested by the application (e.g., for providing the user devices 105 access to the application) based on reviewing the request for the application. The primary application cloud instance 110 may allocate the minimum quantity of cloud resources from the primary application cloud instance 110, and may reserve the quantity of cloud resources from the primary application cloud instance 110. The primary application cloud instance 110 may enable (e.g., provide power to) a threshold percentage (e.g., a configurable parameter) of the quantity of cloud resources to conserve cloud resources at the primary application cloud instance 110.

Figure 1D:
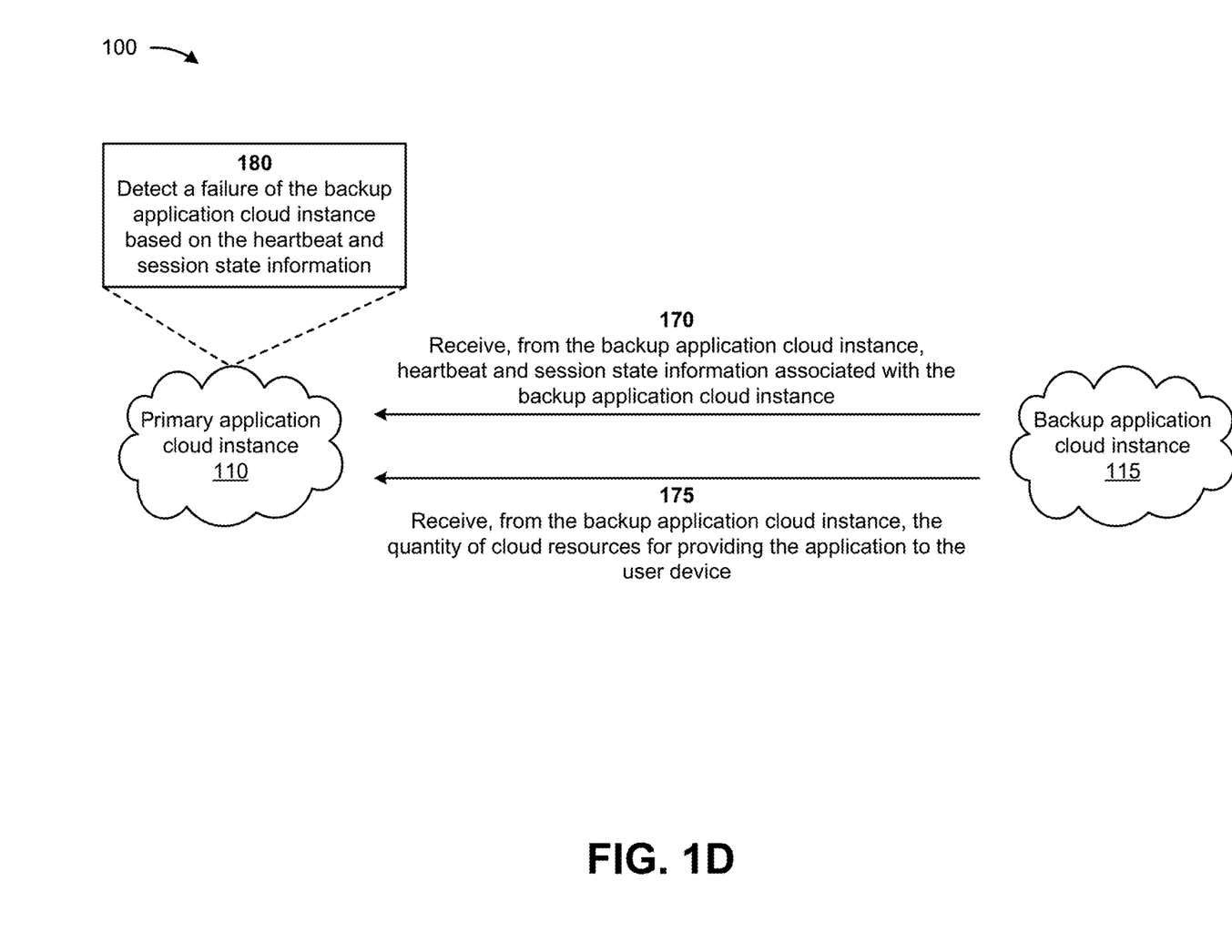

As shown in FIG. 1D, and by reference number 170, the primary application cloud instance 110 may receive, from the backup application cloud instance 115, heartbeat and session state information associated with the backup application cloud instance 115. For example, the backup application cloud instance 115 may generate the heartbeat and session state information while the backup application cloud instance 115 is providing the user devices 105 access to the application. The heartbeat state information may include information indicating whether the backup application cloud instance 115 is operational and/or functioning correctly. The session state information may include information indicating whether the backup application cloud instance 115 is correctly providing the user devices 105 access to the application. The primary application cloud instance 110 may continuously receive the heartbeat and session state information from the backup application cloud instance 115, may periodically receive the heartbeat and session state information from the backup application cloud instance 115, may receive the heartbeat and session state information from the backup application cloud instance 115 based on a request from the primary application cloud instance 110, and/or the like.

As further shown in FIG. 1D, and by reference number 175, the primary application cloud instance 110 may receive, from the backup application cloud instance 115, the quantity of cloud resources for providing the user devices 105 access to the application. For example, the primary application cloud instance 110 may continuously receive, from the backup application cloud instance 115, a current cloud resource usage by the backup application cloud instance 115. The current cloud resource usage by the backup application cloud instance 115 may correspond to the quantity of cloud resources (e.g., of the backup application cloud instance 115) for providing the user devices 105 access to the application. In some implementations, the primary application cloud instance 110 may periodically receive (e.g., at configurable periodic intervals), from the backup application cloud instance 115, the current cloud resource usage by the backup application cloud instance 115. In some implementations, the primary application cloud instance 110 may receive, from the backup application cloud instance 115, the current cloud resource usage by the backup application cloud instance 115 based on a request from the primary application cloud instance 110.

As further shown in FIG. 1D, and by reference number 180, the primary application cloud instance 110 may detect a failure of the backup application cloud instance 115 based on the heartbeat and session state information. For example, the primary application cloud instance 110 may fail to receive the heartbeat state information from the backup application cloud instance 115, and may detect the failure of the backup application cloud instance 115 based on failing to receive the heartbeat state information. Alternatively, or additionally, the primary application cloud instance 110 may fail to receive the session state information from the backup application cloud instance 115, and may detect the failure of the backup application cloud instance 115 based on failing to receive the session state information. Alternatively, or additionally, the primary application cloud instance 110 may identify an error in the session state information from the backup application cloud instance 115, and may detect the failure of the backup application cloud instance 115 based on identifying the error in the session state information. In some implementations, the failure of the backup application cloud instance 115 may indicate that the backup application cloud instance 115 is no longer capable of providing the user devices 105 access to the application.

Figure 1E:
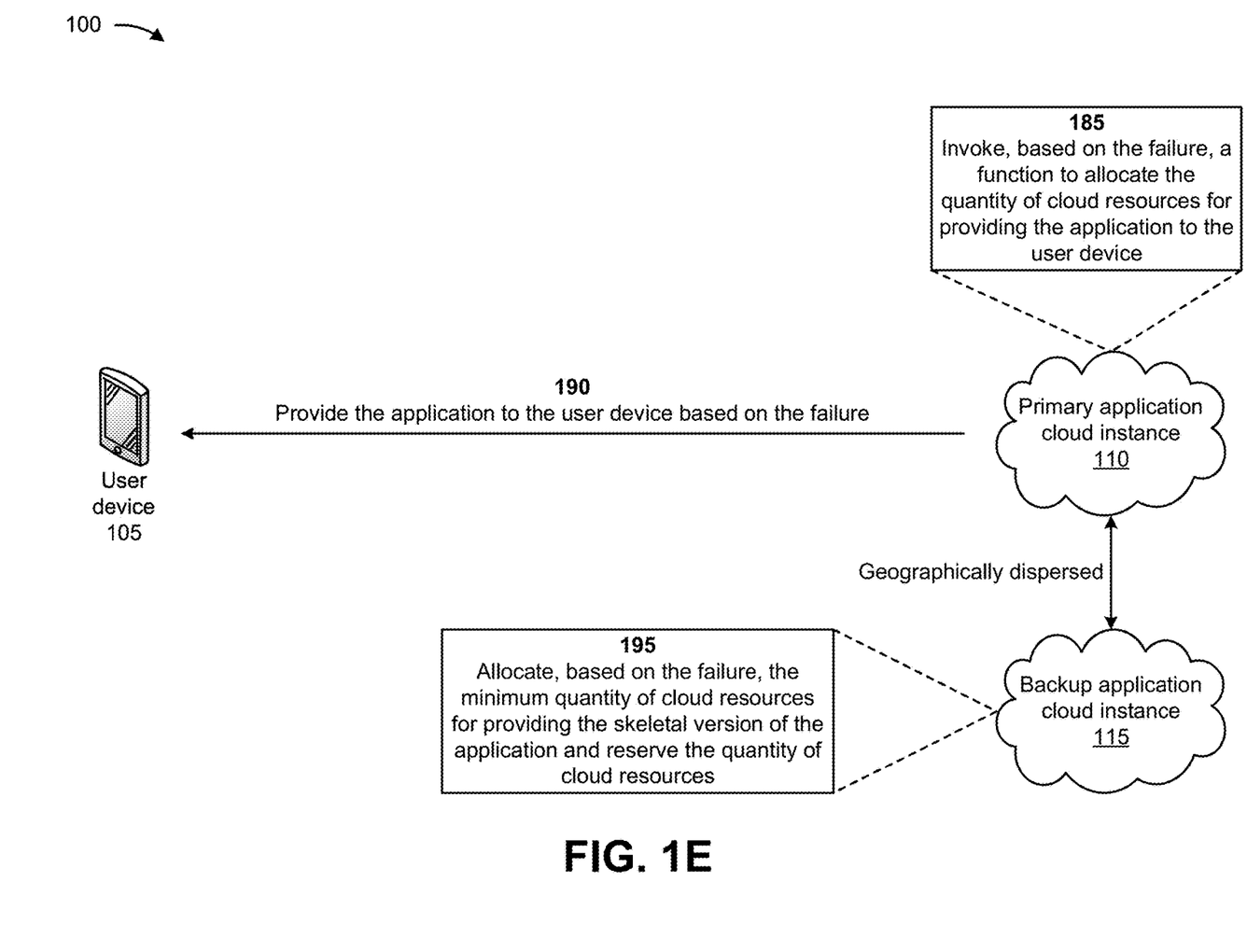

As shown in FIG. 1E, and by reference number 185, the primary application cloud instance 110 may invoke, based on the failure, a function to allocate the quantity of cloud resources for providing the user devices 105 access to the application. For example, when the primary application cloud instance 110 detects the failure of the backup application cloud instance 115, the primary application cloud instance 110 may become an active (e.g., primary) application cloud instance. In some implementations, the primary application cloud instance 110 may invoke, based on the failure, the fast resource addition function to allocate the quantity of cloud resources for providing the user devices 105 access to the application. Alternatively, or additionally, the primary application cloud instance 110 may invoke, based on the failure, the cloud autoscaling function to allocate the quantity of cloud resources for providing the user devices 105 access to the application. The fast resource addition function and/or the cloud autoscaling function may enable the primary application cloud instance 110 to quickly scale up cloud resources to the same quantity of cloud resources used by the backup application cloud instance 115 or to provide enough cloud resources to meet an existing traffic load of the application.

As further shown in FIG. 1E, and by reference number 190, the primary application cloud instance 110 may provide the user devices 105 access to the application based on the failure. For example, the primary application cloud instance 110 may utilize the quantity of cloud resources (e.g., or the allocated cloud resources for the existing traffic load) to provide the user devices 105 access to the application based on the failure of the backup application cloud instance 115. The user devices 105 may access the application from the primary application cloud instance 110 and may interact with the application via the primary application cloud instance 110 (e.g., provide inputs to the application, receive information from the application, and/or the like).

As further shown in FIG. 1E, and by reference number 195, the backup application cloud instance 115 may allocate, based on the failure, the minimum quantity of cloud resources for providing the skeletal version of the application and may reserve the quantity of cloud resources. For example, the backup application cloud instance 115 may become a backup dormant application cloud instance for the application based on the failure of the backup application cloud instance 115. The backup application cloud instance 115 may review the request for the application, and may determine the minimum quantity of cloud resources for providing the skeletal version of the application to the user devices 105 based on reviewing the request for the application. The backup application cloud instance 115 may also determine the quantity of cloud resources requested by the application (e.g., for providing the user devices 105 access to the application) based on reviewing the request for the application. The backup application cloud instance 115 may allocate the minimum quantity of cloud resources from the backup application cloud instance 115, and may reserve the quantity of cloud resources from the backup application cloud instance 115. The backup application cloud instance 115 may enable (e.g., provide power to) a threshold percentage (e.g., a configurable parameter) of the quantity of cloud resources to conserve cloud resources at the backup application cloud instance 115.

In this way, the primary application cloud instance 110 (or the backup application cloud instance 115) optimizes resources for applications deployed in primary and backup geographically dispersed cloud environments. For example, the primary application cloud instance 110 may be allocated a quantity of cloud resources necessary to execute an application, and the backup application cloud instance 115 may be allocated a minimum quantity of cloud resources for providing a skeletal version of the application. The backup application cloud instance 115 may also reserve the quantity of cloud resources utilized by the primary application cloud instance 110 to execute the application. Thus, the primary application cloud instance 110 and the backup application cloud instance 115 may conserve computing resources, networking resources, and/or other resources that would have otherwise been consumed by requiring idle computing resources for the application, unnecessarily consuming power with the idle computing resources for the application, unnecessarily cooling the idle computing resources for the application, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
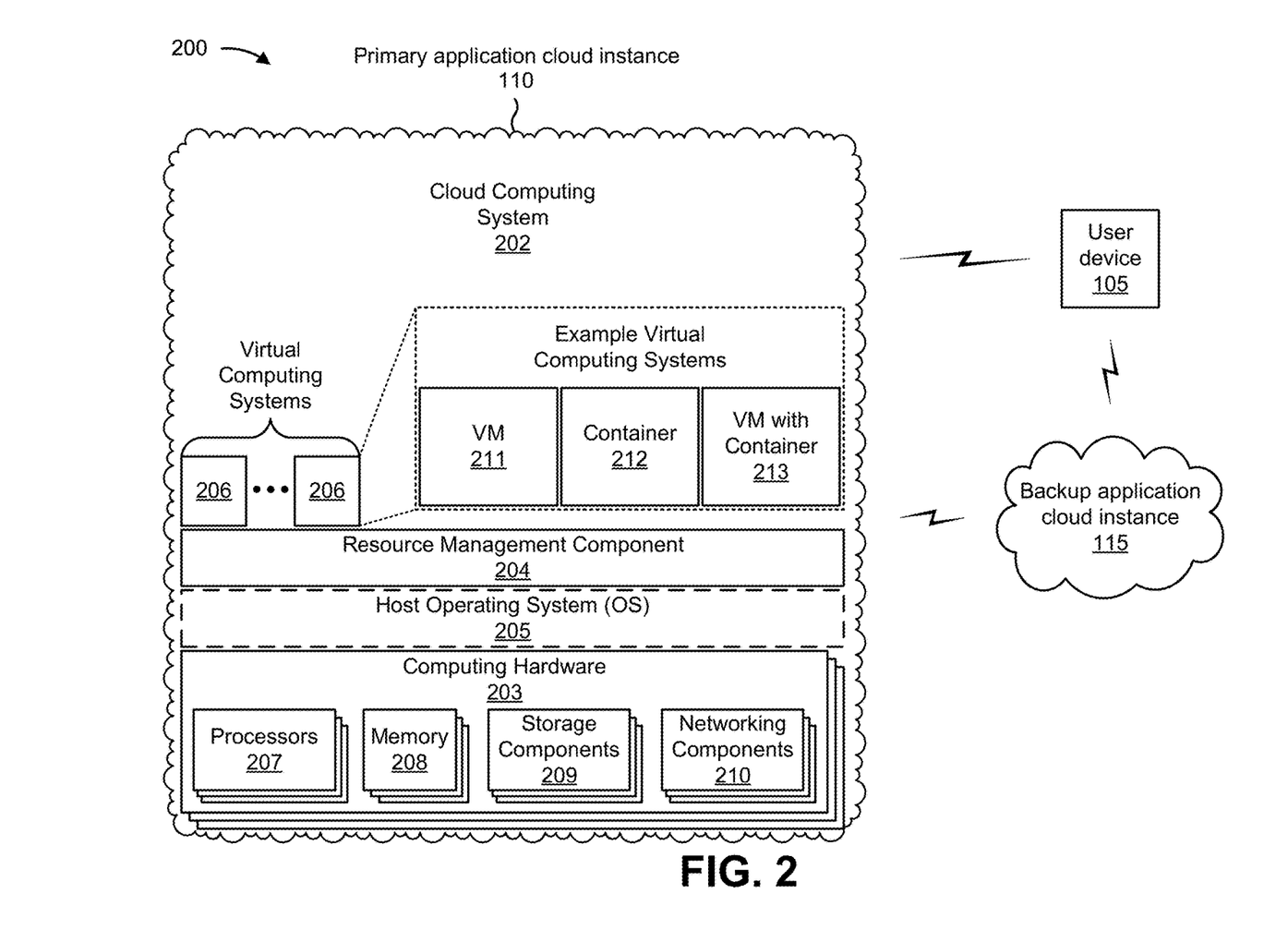
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the primary application cloud instance 110 and the backup application cloud instance 115, each of which may include one or more elements of and/or may execute within a cloud computing system 202. The cloud computing system 202 may include one or more elements 203-213, as described in more detail below. As further shown in FIG. 2, the environment 200 may include the user device 105. Devices and/or elements of the environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although each of the primary application cloud instance 110 and the backup application cloud instance 115 may include one or more elements 203-213 of the cloud computing system 202, may execute within the cloud computing system 202, and/or may be hosted within the cloud computing system 202, in some implementations, the primary application cloud instance 110 and/or the backup application cloud instance 115 may not be cloud-based (e.g., may be implemented outside of a cloud computing system) or may be partially cloud-based. For example, each of the primary application cloud instance 110 and the backup application cloud instance 115 may include one or more devices that are not part of the cloud computing system 202, such as the device 300 of FIG. 3, which may include a standalone server or another type of computing device. The primary application cloud instance 110 and the backup application cloud instance 115 may perform one or more operations and/or processes described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
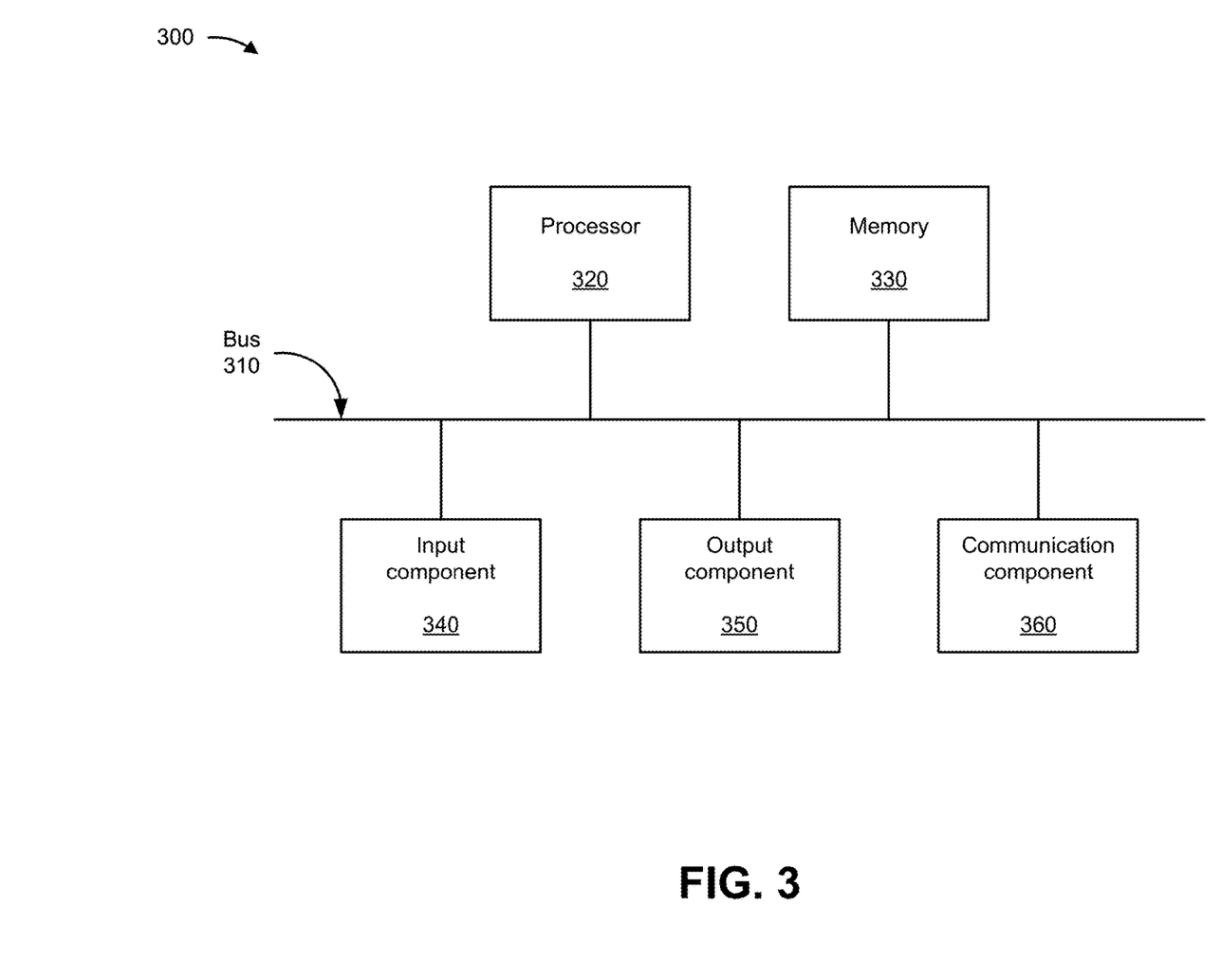
FIG. 3 is a diagram of example components of one or more devices of FIG. 2.

FIG. 3 is a diagram of example components of a device 300, which may correspond to the user device 105, the primary application cloud instance 110, and/or the backup application cloud instance 115. In some implementations, the user device 105, the primary application cloud instance 110, and/or the backup application cloud instance 115 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
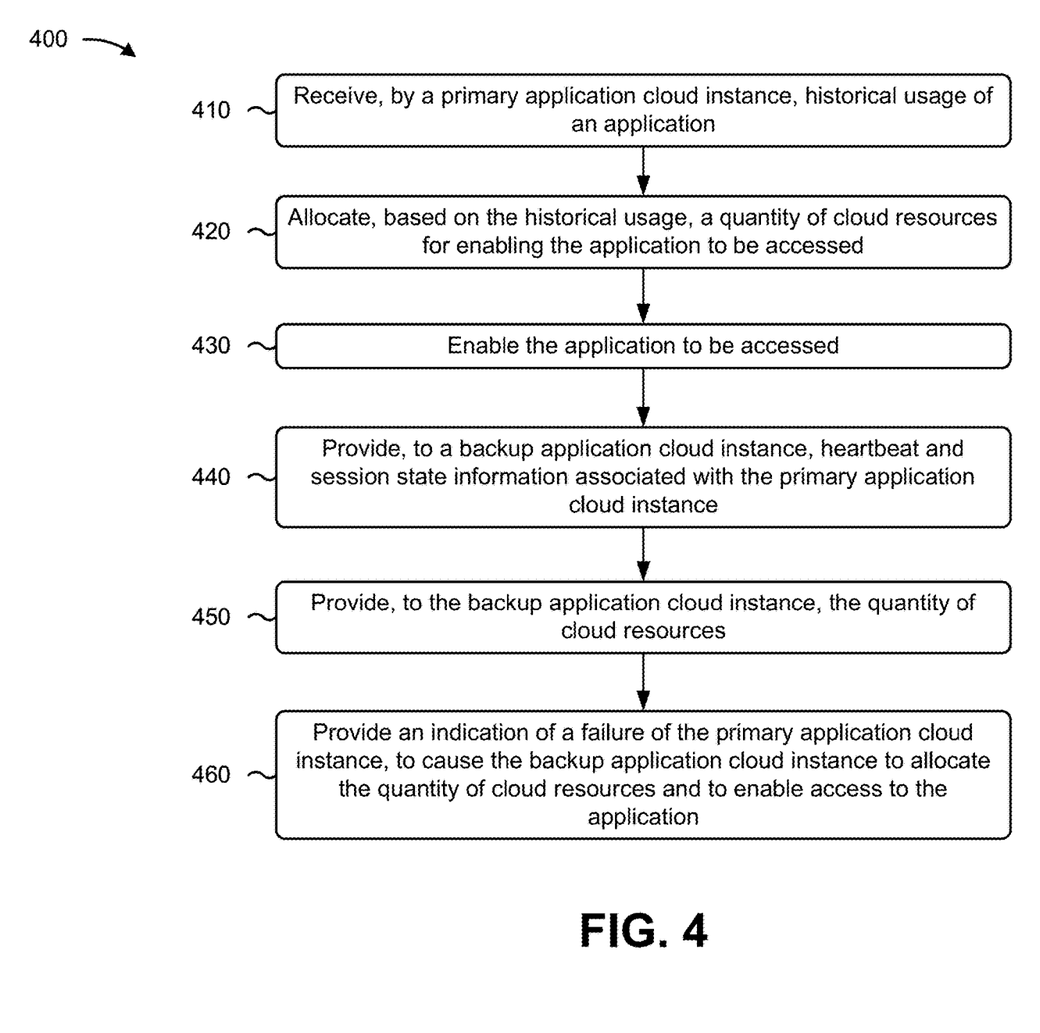
FIG. 4 depicts a flowchart of an example process for optimizing resources for applications deployed in primary and backup geographically dispersed cloud environments.

FIG. 4 depicts a flowchart of an example process 400 for optimizing resources for applications deployed in primary and backup geographically dispersed cloud environments. In some implementations, one or more process blocks of FIG. 4 may be performed by a device (e.g., the primary application cloud instance 110). In some implementations, one or more process blocks of FIG. 4 may be performed by another device or a group of devices separate from or including the device, such as a backup application cloud instance (e.g., the backup application cloud instance 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving historical usage of an application (block 410). For example, the primary application cloud instance may receive historical usage of an application, as described above.

As further shown in FIG. 4, process 400 may include allocating, based on the historical usage, a quantity of cloud resources for enabling the application to be accessed (block 420). For example, the primary application cloud instance may allocate, based on the historical usage, a quantity of cloud resources for enabling the application to be accessed, as described above.

As further shown in FIG. 4, process 400 may include enabling the application to be accessed (block 430). For example, the primary application cloud instance may enable the application to be accessed, as described above.

As further shown in FIG. 4, process 400 may include providing, to a backup application cloud instance that allocates a minimum quantity of cloud resources for providing a skeletal version of the application, heartbeat and session state information associated with the primary application cloud instance (block 440). For example, the primary application cloud instance may provide, to a backup application cloud instance that allocates a minimum quantity of cloud resources for providing a skeletal version of the application, heartbeat and session state information associated with the primary application cloud instance, as described above. In some implementations, the backup application cloud instance is configured to reserve the quantity of cloud resources for enabling the application to be accessed. In some implementations, a distance between the primary application cloud instance and the backup application cloud instance is greater than a threshold.

As further shown in FIG. 4, process 400 may include providing, to the backup application cloud instance, the quantity of cloud resources for enabling the application to be accessed (block 450). For example, the primary application cloud instance may provide, to the backup application cloud instance, the quantity of cloud resources for enabling the application to be accessed, as described above. In some implementations, providing, to the backup application cloud instance, the quantity of cloud resources for enabling the application to be accessed includes providing, to the backup application cloud instance and at periodic intervals, a current cloud resource usage, by the primary application cloud instance, for enabling the application to be accessed.

As further shown in FIG. 4, process 400 may include providing, to the backup application cloud instance, an indication of a failure of the primary application cloud instance, via the heartbeat and session state information, to cause the backup application cloud instance to allocate the quantity of cloud resources and to enable access to the application (block 460). For example, the primary application cloud instance may provide, to the backup application cloud instance, an indication of a failure of the primary application cloud instance, via the heartbeat and session state information, to cause the backup application cloud instance to allocate the quantity of cloud resources and to enable access to the application, as described above. In some implementations, the backup application cloud instance is configured to invoke, based on the indication of the failure of the primary application cloud instance, a function that allocates the quantity of cloud resources for enabling the application to be accessed or that allocates another quantity of cloud resources to satisfy a traffic load of the application. In some implementations, the function includes a fast resource addition function or a cloud autoscaling function.

In some implementations, process 400 includes allocating, by the primary application cloud instance and based on the failure of the primary application cloud instance, the minimum quantity of cloud resources for providing the skeletal version of the application; and reserving, by the primary application cloud instance and based on the failure of the primary application cloud instance, the quantity of cloud resources for enabling the application to be accessed.

In some implementations, process 400 includes receiving, from the backup application cloud instance, additional heartbeat and session state information associated with the backup application cloud instance; and receiving, from the backup application cloud instance, the quantity of cloud resources for enabling the application to be accessed.

In some implementations, process 400 includes detecting a failure of the backup application cloud instance based on the additional heartbeat and session state information; and invoking, based on the failure of the backup application cloud instance, a function to allocate the quantity of cloud resources for enabling the application to be accessed or to allocate another quantity of cloud resources to satisfy a traffic load of the application. In some implementations, process 400 includes enabling the application to be accessed based on the failure of the backup application cloud instance. In some implementations, the backup application cloud instance is configured to reallocate, based on the failure of the backup application cloud instance, the minimum quantity of cloud resources for providing the skeletal version of the application and to reserve the quantity of cloud resources.

In some implementations, process 400 includes reserving, based on the failure of the primary application cloud instance, the quantity of cloud resources for enabling the application to be accessed, and providing power to a percentage of the quantity of cloud resources for enabling the application to be accessed. In some implementations, the percentage is a configurable parameter.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a primary application cloud instance, historical usage of an application;
    allocating, by the primary application cloud instance and based on the historical usage, a quantity of cloud resources for enabling the application to be accessed;
    enabling, by the primary application cloud instance, the application to be accessed;
    providing, by the primary application cloud instance and to a backup application cloud instance that allocates a minimum quantity of cloud resources for providing a skeletal version of the application, heartbeat and session state information associated with the primary application cloud instance;
    providing, by the primary application cloud instance and to the backup application cloud instance, the quantity of cloud resources for enabling the application to be accessed; and
    providing, by the primary application cloud instance and to the backup application cloud instance, an indication of a failure of the primary application cloud instance, via the heartbeat and session state information, to cause the backup application cloud instance to allocate the quantity of cloud resources and to enable access to the application.

2. The method of claim 1, wherein providing, to the backup application cloud instance, the quantity of cloud resources for enabling the application to be accessed comprises:
    providing, to the backup application cloud instance and at periodic intervals, a current cloud resource usage, by the primary application cloud instance, for enabling the application to be accessed.

3. The method of claim 1, further comprising:
    allocating, by the primary application cloud instance and based on the failure of the primary application cloud instance, the minimum quantity of cloud resources for providing the skeletal version of the application; and
    reserving, by the primary application cloud instance and based on the failure of the primary application cloud instance, the quantity of cloud resources for enabling the application to be accessed.

4. The method of claim 1, further comprising:
    receiving, from the backup application cloud instance, additional heartbeat and session state information associated with the backup application cloud instance; and
    receiving, from the backup application cloud instance, the quantity of cloud resources for enabling the application to be accessed.

5. The method of claim 4, further comprising:
detecting a failure of the backup application cloud instance based on the additional heartbeat and session state information; and
invoking, based on the failure of the backup application cloud instance, a function to allocate the quantity of cloud resources for enabling the application to be accessed or to allocate another quantity of cloud resources to satisfy a traffic load of the application.

6. The method of claim 5, further comprising:
enabling the application to be accessed based on the failure of the backup application cloud instance.

7. The method of claim 5, wherein the backup application cloud instance is configured to reallocate, based on the failure of the backup application cloud instance, the minimum quantity of cloud resources for providing the skeletal version of the application and to reserve the quantity of cloud resources.

8. A primary application cloud instance, comprising:
one or more processors configured to:
receive historical usage of an application;
allocate, based on the historical usage, a quantity of cloud resources for enabling the application to be accessed;
enable the application to be accessed;
provide, to a backup application cloud instance, heartbeat and session state information associated with the primary application cloud instance,
wherein the backup application cloud instance is configured to allocate a minimum quantity of cloud resources for providing a skeletal version of the application;
provide, to the backup application cloud instance, the quantity of cloud resources for enabling the application to be accessed; and
provide, to the backup application cloud instance, an indication of a failure of the primary application cloud instance, via the heartbeat and session state information,
wherein the backup application cloud instance is configured to allocate the quantity of cloud resources and to enable the application to be accessed.

9. The primary application cloud instance of claim 8, wherein the backup application cloud instance is configured to reserve the quantity of cloud resources for enabling the application to be accessed.

10. The primary application cloud instance of claim 8, wherein a distance between the primary application cloud instance and the backup application cloud instance is greater than a threshold.

11. The primary application cloud instance of claim 8, wherein the backup application cloud instance is configured to invoke, based on the indication of the failure of the primary application cloud instance, a function that allocates the quantity of cloud resources for enabling the application to be accessed or that allocates another quantity of cloud resources to satisfy a traffic load of the application.

12. The primary application cloud instance of claim 11, wherein the function includes a fast resource addition function or a cloud autoscaling function.

13. The primary application cloud instance of claim 8, wherein the one or more processors are further configured to:
reserve, based on the failure of the primary application cloud instance, the quantity of cloud resources for enabling the application to be accessed; and
provide power to a percentage of the quantity of cloud resources for enabling the application to be accessed.

14. The primary application cloud instance of claim 13, wherein the percentage is a configurable parameter.

15. A non-transitory computer-readable medium storing a set of instructions, the set of instructions comprising:
one or more instructions that, when executed by one or more processors of a primary application cloud instance, cause the primary application cloud instance to:
receive historical usage of an application;
allocate, based on the historical usage, a quantity of cloud resources for enabling the application to be accessed;
enable the application to be accessed;
provide, to a backup application cloud instance that allocates a minimum quantity of cloud resources for providing a skeletal version of the application, heartbeat and session state information associated with the primary application cloud instance;
provide, to the backup application cloud instance, the quantity of cloud resources for enabling the application to be accessed;
provide, to the backup application cloud instance, an indication of a failure of the primary application cloud instance, via the heartbeat and session state information, to cause the backup application cloud instance to allocate the quantity of cloud resources and to enable the application to be accessed;
allocate, based on the failure of the primary application cloud instance, the minimum quantity of cloud resources for providing the skeletal version of the application; and
reserve, based on the failure of the primary application cloud instance, the quantity of cloud resources for enabling the application to be accessed.

16. The non-transitory computer-readable medium of claim 15, wherein the one or more instructions, that cause the primary application cloud instance to provide, to the backup application cloud instance, the quantity of cloud resources for enabling the application to be accessed, cause the primary application cloud instance to:
provide, to the backup application cloud instance and at periodic intervals, a current cloud resource usage, by the primary application cloud instance, for enabling the application to be accessed.

17. The non-transitory computer-readable medium of claim 15, wherein the one or more instructions further cause the primary application cloud instance to:
receive, from the backup application cloud instance, additional heartbeat and session state information associated with the backup application cloud instance;
receive, from the backup application cloud instance, the quantity of cloud resources for enabling the application to be accessed;
detect a failure of the backup application cloud instance based on the additional heartbeat and session state information;
invoke, based on the failure of the backup application cloud instance, a function to allocate the quantity of cloud resources for enabling the application to be accessed or to allocate another quantity of cloud resources to satisfy a traffic load of the application; and
enable the application to be accessed based on the failure of the backup application cloud instance.

18. The non-transitory computer-readable medium of claim 15, wherein the backup application cloud instance is configured to reserve the quantity of cloud resources for enabling the application to be accessed.

19. The non-transitory computer-readable medium of claim 15, wherein a distance between the primary application cloud instance and the backup application cloud instance is greater than a threshold.

20. The non-transitory computer-readable medium of claim 15, wherein the backup application cloud instance is configured to invoke, based on the indication of the failure of the primary application cloud instance, a function that allocates the quantity of cloud resources for enabling the application to be accessed or that allocates another quantity of cloud resources to satisfy a traffic load of the application.

* * * * *